United States Patent [19]
Ahle

[11] Patent Number: 5,899,051
[45] Date of Patent: May 4, 1999

[54] AGRICULTURAL HARVESTER

[75] Inventor: Josef Ahle, Höchstädt, Germany

[73] Assignee: SAME Deutz-Fahr S.p.A., Treviglio, Italy

[21] Appl. No.: 08/886,646

[22] Filed: Jul. 1, 1997

[30] Foreign Application Priority Data

Jul. 25, 1996 [DE] Germany .................. 196 29 957

[51] Int. Cl.⁶ ........................................... A01D 41/06
[52] U.S. Cl. ........................ 56/14.5; 56/153; 460/114
[58] Field of Search ............................ 56/14.5, 14.3, 56/16.4 R, 153, 180, 194, 228, 321, DIG. 3, DIG. 10; 460/114, 119

[56] References Cited

U.S. PATENT DOCUMENTS

| 3,699,753 | 10/1972 | Peak | 56/14.5 |
| 4,266,391 | 5/1981 | McDuffie et al. | 56/14.5 |
| 4,266,392 | 5/1981 | Knepper et al. | 56/14.5 |

*Primary Examiner*—Terry Lee Melius
*Attorney, Agent, or Firm*—Hardaway Law Firm, P.A.; Charles L. Schwab

[57] ABSTRACT

An agricultural harvester has a header connected to a conveying unit for pivotal movement about a longitudinal axis to adjust for changes in ground contour. An endless conveyor is supported in the conveying duct of the conveying unit in a manner permitting its forward end to move vertically and a mechanism is provided to prevent contact between the conveying chains of the endless conveyor and the discharge doorway of the header unit when a predetermined pivotal movement of the header unit occurs.

7 Claims, 1 Drawing Sheet ns projecting forwardly past the chain wheel shaft so that upon predetermined pivoting of the header unit, one of the extensions will abut one of the laterally spaced abutments on the header unit at the discharge doorway. Since the relative vertical movement between the arm extensions and the discharge doorway abutments is caused by pivoting of the header unit relative to the conveying unit, only one extension will contact its confronting abutment upon the predetermined pivoting of the header unit. The endless conveyor support arms and the discharge doorway with abutments are modified mass-produced parts, thus permitting the invention to be achieved at a very low cost.

AGRICULTURAL HARVESTER

TECHNICAL FIELD

This invention relates to a mobile agricultural harvester having a crop receiving platform or a header unit pivotally connected to a conveying unit for movement about an axis in the direction of travel so as to adjust for variations in the ground contour.

BACKGROUND OF THE INVENTION

Agricultural harvesters, to which this invention relates, have a header unit connected to the front end of a conveying unit whose downstream or rear end is connected to a processing unit. The crop receiving platform, or header unit, has a discharge doorway pivotally supported on a pivot frame of the conveying unit. The conveying unit includes an inclined, endless chain conveyor, which forms a conveying gap with the floor of the conveying unit, and the conveying unit is pivotally connected at its rear end to the harvester on a transverse pivot axis so that its front end can be raised and lowered, along with the attached header unit, to adjust the working height of the header unit.

The harvested material is transported in the conveying gap between the floor of the conveying unit and the bottom strand of the conveying chains of the conveyor whereby the conveying flights of the conveying chains deliver the harvested material to the downstream processing means by positive and frictional propulsion.

In order to achieve problem-free transport of the harvested material, the conveyor chain shaft nearest the header unit must be arranged as close as possible to a transverse intake auger in the header unit so that the conveying flights on the conveying chains are just short of touching the intake auger.

This arrangement works satisfactorily if the pivot angle of the header unit relative to the conveying unit remains relatively small as compensations are made for unevenness of the ground. In the case of hillside combines, larger pivot angles can occur leading to a collision of conveying chains or conveying flights with the header unit discharge doorway, thereby causing damage.

OBJECTS AND SUMMARY OF THE INVENTION

It is an object of the invention to create an agricultural harvester having a conveying unit which operates in a satisfactory manner, even at large pivot angles of the header unit relative to the conveying unit.

The stated objective is achieved by providing a construction by which the front end of the endless conveyor of the conveying unit moves vertically in dependence on the pivotal movement of the header unit relative to the conveying unit. This ensures a safety clearance between the discharge doorway of the header unit and the conveyor chains and prevents damage to those parts.

In a preferred embodiment of the invention, the upstream end of the endless conveyor moves vertically upon abutment of a part of the conveyor with either of two abutments at the discharge doorway of the header unit. A simple and thus low-cost and reliable embodiment of the invention is thus achieved by direct mechanical contact between confronting abutments on the header unit and the conveying mechanism.

The conveying mechanism may be an inclined chain conveyor whose upstream chain wheel shaft is supported on a pair of parallel pivotable support arms which have exten- The conveyor shaft support arm extensions in the normal position of the header unit are disposed some distance from the abutments and the upstream conveying chain shaft is not raised until the header unit is pivoted to a predetermined angle, thus the conveying gap between the conveyor slats and the floor of the conveying unit remains optimal in size for the conveyance of harvested material over a wide pivot range.

The downstream ends of the front conveyor shaft support arms are supported in the side walls of the conveying duct of the conveying unit and may be disposed either inside or outside the conveying duct. The support arms are connected in semirigid to rigid fashion by means of interconnecting elements. This solution is low in cost and facilitates an undisturbed flow of the harvested material in the conveying duct. When one support arm is lifted the other support arm also is lifted along with it because of the interconnecting elements. Excessive and great twisting of the conveying chains is averted by this interconnection of the support arms.

BRIEF DESCRIPTION OF THE DRAWINGS

Further features of the invention are revealed in the description that follows and in the drawings, in which.

DETAILED DESCRIPTION OF THE INVENTION

Figure 1:
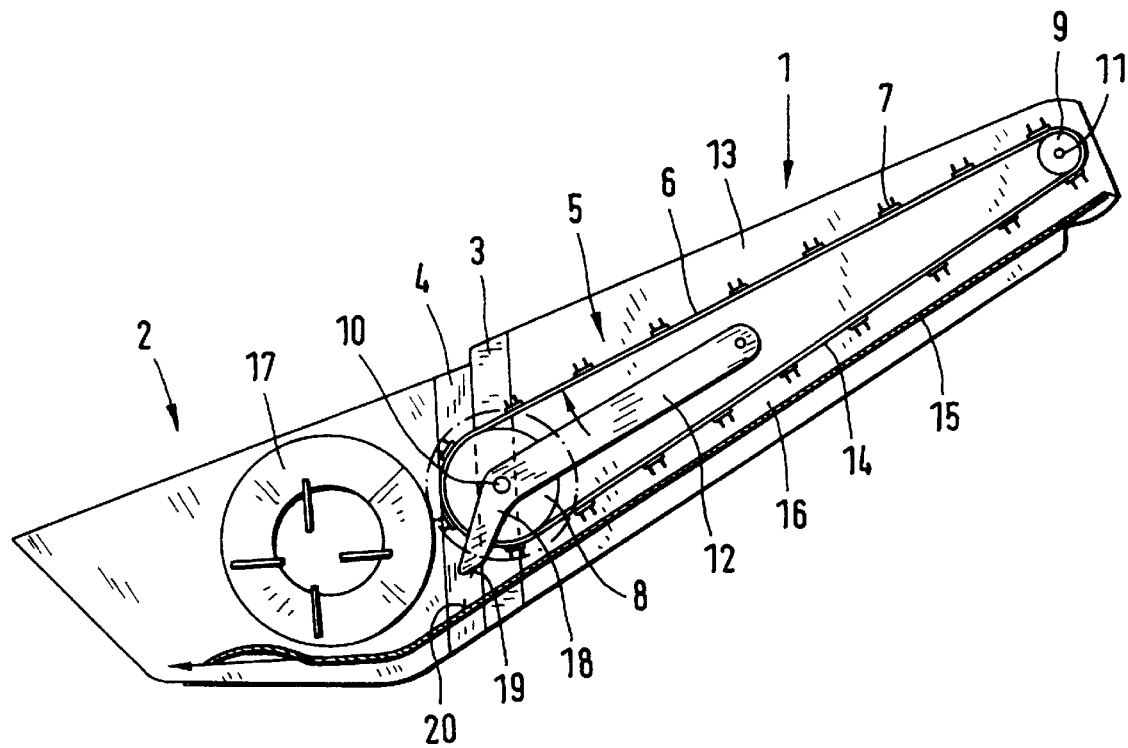
FIG. 1 shows one embodiment of the invention with the header unit in its normal operating position relative to the conveying unit and, FIG. 2 shows the header unit in a pivoted position relative to the conveying unit.

FIG. 1 shows a conveying duct 1 of a conveying unit, to which a header unit 2 is pivotally attached. The attachment is effected by the pivot connection between a pivot frame 3 rigidly secured to the conveying duct 1 and a discharge doorway 4 attached to the header unit 2.

Disposed in the conveying duct 1 is an endless conveyor in the form of an inclined and endless chain conveyor 5 having conveying chains 6 to which conveying flights 7 are attached. The conveying chains are guided by front chain wheels 8 and by means of rear chain wheels 9. The front or upstream chain wheels 8 are connected to an upstream or front conveying chain shaft 10; the rear chain wheels 9 are connected to a rear conveying chain shaft 11.

The front conveying chain shaft 10 is supported by means of two pivoting supports on two laterally spaced and parallel support arms 12. The support arms 12 are pivotally supported on laterally spaced and parallel side walls 13 of the conveying duct 1. The rear conveying chain shaft 9 is likewise supported on the side walls 13. A conveying gap 16 is formed between the bottom strands 14 of the conveying chains 6 and the floor 15 of the conveying duct.

The header unit 2 includes, among other things, an intake auger 17, to whose circumference the conveying chains 6 almost reach. The front end of the endless conveyor extends through the pivot frame and into the discharge doorway 4 of the header unit 2.

Each of support arms 12 has a downward angled extension 18 with an abutment 19 at its free end which is in vertical confronting relation to one of a pair of laterally spaced stops or abutments 20 on the discharge doorway 4. In the normal position of the header unit 2, there is a clearance between the abutments 19 and the stops 20. By this means the extended support arm 12 is not moved until after a predetermined pivoting of the header unit 2. This permits the conveying gap 16 to remain in its optimal configuration for the conveyance of harvested material during pivoting movement of the header unit 2 within a predetermined pivot range.

Figure 2:
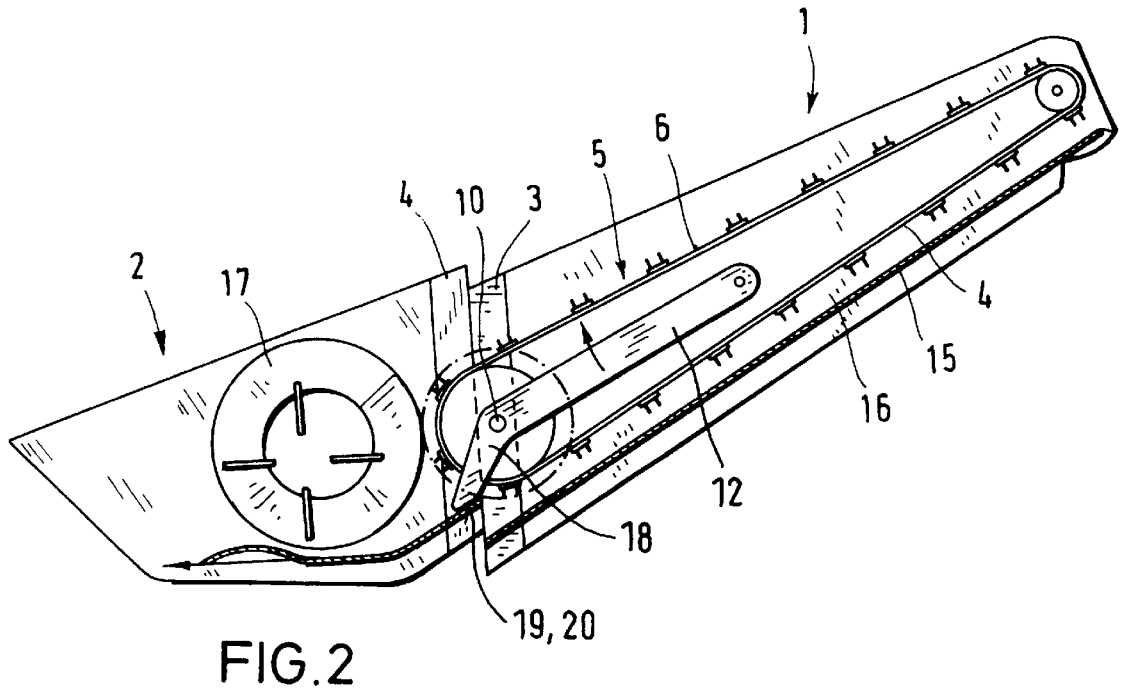

FIG. 2 shows the header unit with the header unit 2 in pivoted position relative to the conveying duct 1. The support arm 12, and with it one side of the front conveying chain shaft 10, is lifted by the stop 20 contacting the abutment 19 of the extension 18. The raising of the front conveying chain shaft 10 prevents the conveying chains 6 from destructive collision with the stop 20 and the discharge door 4 in case of intense pivoting of header unit 2.

What is claimed is:

1. An agricultural harvester comprising:

a fore and aft extending conveying unit including a conveying duct (1) with laterally spaced sidewalls and a floor (15), a pivot frame (3) rigidly secured to the front end of said conveying duct (1), a header unit (2) with a discharge doorway (4) supported on said pivot frame (3) of said conveying duct, for pivotal movement about a fore and aft extending axis, a fore and aft extending endless conveyor (5) supported in said conveying duct (1) by support apparatus permitting the front end of said endless conveyor (5) to move vertically relative to said pivot frame (3) and said conveying duct (1) and a lift mechanism operable to raise the front end of said endless conveyor (5) in response to predetermined pivotal movement of said header unit (2) relative to said conveying duct (1) about said fore and aft extending axis.

2. The agricultural harvester of claim 1 wherein said lift mechanism includes first and second pairs of vertically confronting abutments on said header unit and said endless conveyor.

3. The agricultural harvester of claim 2 wherein said first pair of vertically confronting abutments are disposed at one lateral side of said discharge doorway and said second pair of vertically confronting abutments are disposed at the lateral side of said discharge doorway opposite to said one lateral side.

4. The agricultural harvester of claim 2 wherein said endless conveyor includes a chain shaft at its forward end supported by a pair of laterally spaced and parallel support arms, said support arms each including an extension projecting forwardly and presenting one of said abutments.

5. The agricultural harvester of claim 4 wherein said confronting abutments of each pair of abutments are vertically spaced from one another in the normal position of said header unit.

6. The agricultural harvester of claim 4 wherein said support arms are pivotally supported at their rear ends to said side walls of said conveying duct.

7. The agricultural harvester of claim 6 wherein said support arms are interconnected to one another.

* * * * *